(12) United States Patent
Babinski (10) Patent No.: US 8,151,366 B2
(45) Date of Patent: Apr. 3, 2012

(54) SECURE OPTICAL MEDIA STORAGE (75) Inventor: James P. Babinski, Throop, PA (US)

(73) Assignee: Cinram International Inc., Scarborough (CA)

( * ) Notice: Subject to any disclaimer, the term of this patent is extended or adjusted under 35 U.S.C. 154(b) by 1336 days.

(21) Appl. No.: 10/987,768

(22) Filed: Nov. 12, 2004

(65) Prior Publication Data

US 2006/0104190 A1    May 18, 2006

(51) Int. Cl.
  *H04N 7/16*     (2006.01)
  *G06F 7/04*     (2006.01)
(52) U.S. Cl. ......... 726/31; 726/27; 380/201; 369/53.21; 369/275.1
(58) Field of Classification Search .................. None
  See application file for complete search history.

(56) References Cited

U.S. PATENT DOCUMENTS

| | | | |
|---|---|---|---|
| 5,247,494 A | | 9/1993 | Ohno et al. |
| 5,303,224 A | | 4/1994 | Chikuma et al. |
| 5,457,746 A | | 10/1995 | Dolphin |
| 5,540,966 A | | 7/1996 | Hintz |
| 5,555,304 A | * | 9/1996 | Hasebe et al. ................... 705/51 |
| 5,757,749 A | * | 5/1998 | Misawa ......................... 711/164 |
| 5,815,333 A | * | 9/1998 | Yamamoto et al. ............. 360/60 |
| 5,923,640 A | | 7/1999 | Takemura et al. |
| 5,959,946 A | * | 9/1999 | Tognazzini ..................... 368/84 |
| 5,991,798 A | | 11/1999 | Ozaki et al. |
| 6,031,808 A | | 2/2000 | Ueno |
| 6,035,329 A | | 3/2000 | Mages et al. |
| 6,047,292 A | | 4/2000 | Kelly et al. |
| 6,195,693 B1 | | 2/2001 | Berry et al. |
| 6,212,158 B1 | | 4/2001 | Ha et al. |
| 6,223,247 B1 | * | 4/2001 | Otsuka et al. ...................... 711/4 |
| 6,317,407 B1 | | 11/2001 | Takemura et al. |
| 6,317,779 B1 | | 11/2001 | Gile et al. |
| 6,341,375 B1 | | 1/2002 | Watkins |
| 6,396,798 B1 | * | 5/2002 | Takemura et al. ......... 369/275.3 |
| 6,418,111 B1 | | 7/2002 | Takemura et al. |
| 6,438,232 B1 | | 8/2002 | Mages et al. |
| 6,480,462 B2 | | 11/2002 | Ha et al. |
| 6,564,255 B1 | | 5/2003 | Mobini et al. |
| 6,587,424 B2 | | 7/2003 | Kuroda et al. |
| 6,600,713 B1 | * | 7/2003 | Tognazzini ................ 369/275.1 |
| 6,601,139 B1 | * | 7/2003 | Suzuki .......................... 711/115 |
| 6,628,603 B1 | | 9/2003 | Kam et al. |
| 6,631,359 B1 | * | 10/2003 | Braitberg et al. ............... 705/50 |
| 6,678,237 B1 | | 1/2004 | Edwards et al. |
| 6,725,258 B1 | | 4/2004 | Bick et al. |
| 6,782,190 B1 | * | 8/2004 | Morito ........................... 386/252 |
| 6,938,162 B1 | * | 8/2005 | Nagai et al. ................... 713/189 |

(Continued)

OTHER PUBLICATIONS

Graham Sharpless, "Introduction to CD and CD-ROM," Oct. 2004, Deluxe Global Media Services Ltd., pp. 2-31.*

(Continued)

*Primary Examiner* — Eleni Shiferaw
*Assistant Examiner* — Luu Pham
(74) *Attorney, Agent, or Firm* — Cooper & Dunham LLP (57) ABSTRACT

An optical recording medium is provided for distributing content through a portable medium which can be transported by hand from one media player to another media player. The optical recording medium includes a read-only zone and a writable area. Copy control information is stored in the read-only zone. The copy control information specifies (a) an authorized content source and (b) content which is authorized to be downloaded from the authorized content source and recorded in the writable area of the optical recording medium.

17 Claims, 4 Drawing Sheets

U.S. PATENT DOCUMENTS

| | | | |
|---|---|---|---|
| 7,092,335 B2 * | 8/2006 | Horie | 369/53.2 |
| 7,151,729 B1 * | 12/2006 | Park et al. | 369/53.2 |
| 7,325,287 B2 | 2/2008 | Sweeney | |
| 7,359,299 B2 * | 4/2008 | Gotoh | 369/53.21 |
| 7,419,045 B2 | 9/2008 | Kelsch | |
| 7,463,566 B2 * | 12/2008 | Park et al. | 369/53.2 |
| 7,496,766 B2 * | 2/2009 | Kitamura | 713/191 |
| 7,535,806 B2 | 5/2009 | Fumanti | |
| 7,564,771 B2 | 7/2009 | Sweeney | |
| 7,664,000 B2 * | 2/2010 | Horie | 369/100 |
| 2001/0013021 A1 * | 8/2001 | Saito | 705/51 |
| 2001/0042111 A1 | 11/2001 | Douzono | |
| 2002/0025039 A1 * | 2/2002 | Kato et al. | 380/44 |
| 2002/0064111 A1 * | 5/2002 | Horie | 369/47.54 |
| 2002/0112173 A1 * | 8/2002 | Saito | 713/193 |
| 2002/0147635 A1 * | 10/2002 | Lawson | 705/14 |
| 2002/0178145 A1 * | 11/2002 | Ishida | 707/1 |
| 2003/0091866 A1 * | 5/2003 | Ejiri et al. | 428/694 BP |
| 2003/0117921 A1 * | 6/2003 | Gotoh | 369/53.21 |
| 2003/0229679 A1 | 12/2003 | Yoo et al. | |
| 2004/0042363 A1 * | 3/2004 | Kobayashi et al. | 369/53.21 |
| 2004/0044900 A1 | 3/2004 | Wang et al. | |
| 2004/0081044 A1 * | 4/2004 | Sako et al. | 369/47.31 |
| 2004/0143754 A1 * | 7/2004 | Kori et al. | 713/200 |
| 2004/0156503 A1 * | 8/2004 | Bell et al. | 380/44 |
| 2004/0186855 A1 * | 9/2004 | Gotoh | 707/104.1 |
| 2004/0228487 A1 * | 11/2004 | Maeda et al. | 380/232 |
| 2004/0236588 A1 * | 11/2004 | Millard et al. | 705/1 |
| 2004/0240356 A1 * | 12/2004 | Noda et al. | 369/53.21 |
| 2004/0243814 A1 * | 12/2004 | Nakano et al. | 713/189 |
| 2005/0018574 A1 * | 1/2005 | Jenkins et al. | 369/53.21 |
| 2005/0021774 A1 * | 1/2005 | Kurihara et al. | 709/228 |
| 2005/0021988 A1 * | 1/2005 | Kitamura | 713/193 |
| 2005/0058041 A1 * | 3/2005 | Watanabe | 369/53.21 |
| 2005/0078577 A1 * | 4/2005 | Horie | 369/47.28 |
| 2006/0023598 A1 | 2/2006 | Babinski et al. | |
| 2006/0101634 A1 | 5/2006 | Sweeney | |
| 2006/0165419 A1 | 7/2006 | Musto | |
| 2006/0181706 A1 | 8/2006 | Sweeney | |
| 2006/0182009 A1 * | 8/2006 | Horie | 369/275.1 |
| 2006/0222808 A1 | 10/2006 | Pickutoski et al. | |
| 2006/0270080 A1 | 11/2006 | Rinaldi | |
| 2006/0274617 A1 | 12/2006 | Musto et al. | |
| 2007/0008861 A1 | 1/2007 | Fumanti | |
| 2007/0014224 A1 | 1/2007 | Sweeney | |
| 2007/0029167 A1 | 2/2007 | Kelsch | |
| 2007/0033360 A1 * | 2/2007 | Kori et al. | 711/163 |
| 2007/0036044 A1 * | 2/2007 | Park et al. | 369/30.04 |
| 2007/0036063 A1 * | 2/2007 | Park et al. | 369/275.4 |
| 2007/0090006 A1 | 4/2007 | Kelsch | |
| 2007/0098947 A1 | 5/2007 | Mueller | |
| 2008/0117725 A1 * | 5/2008 | Park et al. | 369/30.04 |
| 2008/0123491 A1 * | 5/2008 | Park et al. | 369/53.2 |
| 2008/0273440 A1 * | 11/2008 | Park et al. | 369/84 |
| 2009/0103425 A1 * | 4/2009 | Park et al. | 369/275.3 |

OTHER PUBLICATIONS

Tadao Yoshida, "The Rewritable MiniDisc System," Oct. 1994, IEEE, vol. 82, No. 10, pp. 1492-1500.*
U.S. Appl. No. 11/705,682, filed Feb. 13, 2007.
U.S. Appl. No. 11/715,249, filed Mar. 6, 2007.
U.S. Appl. No. 11/726,968, filed Mar. 22, 2007.
"How Movielink Works", www.movielink.com/commerce/help/ELanding.jhtml.
"America Online and Movielink Extend Partnership to Offer Complimentary and Discounted Movie Downloads to AOL for Broadband Members" "CinemaNow—How It Works", www.cinemanow.com/how.aspx.
"Akimbo Internet VOD Player Available in October".
"MovieBeam—What is MovieBeam?", www.moviebeam.com/about/index.jsp.
"MovieBeam Launching DVD-like Extras".
"Starz on Demand", www.starzondemand.com/svodcs/what_is_it.html.
"DivX Networks touts new studio deals".
"Hacked video technology provides look at MP3-like films".
"will CD-PROM Prove CD-R's real Kodak Moment?—Company Business and Marketing".
"Kodak has discontinued the direct marketing and sale of CD-PROM products effective Oct. 1, 2002", www.kodak.com/US/en/digital/progCDR.
"Kodak , Intel to unveil disc product".
"Kodak, UIT Will Integrate Technologies to Create Personalized, Visually Dynamic Internet Experience".
"CDR-ROM", www.optical-disc.com/CDR_ROM.htm.
U.S. Application of Michael Parette, U.S. Appl. No. 11/705,682, filed Feb. 13, 2007.
U.S. Application of William R. Mueller et al., U.S. Appl. No. 11/715,249, filed Mar. 6, 2007.
U.S. Application of Lewis Gensel et al., U.S. Appl. No. 11/726,968, filed Mar. 22, 2007.
U.S. Application of Petrus Hubertus Van Hoof et al., U.S. Appl. No. 11/936,625, filed Nov. 7, 2007.
U.S. Application of Dominick A. Dallaverde et al., U.S. Appl. No. 11/938,572, filed Nov. 12, 2007.
U.S. Application of Ed Pickutoski, U.S. Appl. No. 12/126,667, filed May 23, 2008.

* cited by examiner

SECURE OPTICAL MEDIA STORAGE

TECHNICAL FIELD

This application relates to optical media storage. In particular, the application relates to distribution of content through a portable medium which can be transported by hand from one media player to another media player.

DESCRIPTION OF RELATED ART

Use of digital media for storing and transporting content has proliferated in recent years. The term "content" is used herein in its broadest sense to denote any form of digital information which consumers may wish to obtain, and can include information from or in the form of, as examples and without limiting it to, text, audio, video, film, photographs, animation, graphics, etc. The content may be obtained from any of numerous sources. The term "content source" is used herein in its broadest sense to include any of the possible sources of digital information through an electronic communication channel, such as the Internet or another computer or telecommunicative network, a dedicated communication link such as an electronic cable connecting an electronic appliance to a computer, etc.

One of the categories of digital media popularly used for storing and transporting digital content is optical storage media ("optical media"), such as CDs (compact discs) and DVDs (digital versatile discs or digital video discs). For example, multimedia content and/or other data can be stored on optical media in an optically readable manner.

Several formats of optical media are currently available, including read-only formats such as CD-DA (digital audio compact disc), CD-ROM (CD-read-only memory), DVD-ROM, etc., and recordable formats in the form of (i) write-once read-many times formats such as CD-R (CD-recordable), and DVD-R (DVD-recordable), etc., or (ii) rewritable formats such as CD-RW (CD-rewriteable), DVD-RAM (DVD-Random Access Media), DVD-RW or DVD+RW (DVD-rewriteable), PD (Phase change Dual disk) and other phase change optical discs.

In conventional read-only type optical media (for example, CD-ROM, DVD-ROM, etc.), data is generally stored as a series of "pits" embossed in a plane of "lands". Microscopic pits formed in a surface of a plastic medium are arranged in tracks, conventionally spaced radially from the center hub in a spiral track originating at the medium center hub and ending toward the medium's outer rim. The intensity of the light reflected from a read-only medium's surface by an optical media player or reader varies according to the presence or absence of pits along the information track. When the readout spot is over the flat part of the track, more light is reflected directly from the disc than when the readout spot is over a pit. A photodetector and other electronics inside the optical media player translate the signal from the transition points between these pits and lands caused by this variation into the 0s and 1s of the digital code representing the stored information.

Recordable type optical media typically include a spiral wobble groove in the substrate. The groove defines recording channels on the disc for recording data, provides information for tracking of the disc while writing or reading data, and has its wobble frequency modulated to contain addressing and other information necessary for the write and read processes. In addition, recordable-type optical media generally include a recording layer. Information is recorded in the recordable-type optical medium by directing a laser light beam modulated by signals to selectively change optical characteristics (reflectivity or extinction coefficient) of the recording layer. The recording layer in write-once read-many times optical media typically includes a photosensitive organic dye which is heated during recording to irreversibly to form a pattern of marks or pits into the recording layer. Rewritable optical media typically include a phase-change type recording layer having a polycrystalline structure. During recording of the rewritable optical medium, the laser selectively heats tiny areas of the recording track to change the phase of each heated area from more crystalline into less crystalline (also known as "amorphous") phase, in order to create marks that can be called "pits". During erase, the laser (in a process called "annealing") changes the amorphous areas back into more crystalline areas.

Hybrid optical media which include a combination of formats have also been proposed. For example, one type of hybrid media includes a ROM disc and a recordable disc, manufactured independent of one another and then adhered to each other. Another proposed type of hybrid media has data pit patterns prerecorded on a surface of a substrate and has in addition a recording layer allowing a user to record data to the recording layer. In addition, optical recording media having multiple recording layers are now available.

According to another hybrid optical recording disc, a read-only area and a recordable area are present on one side of the hybrid optical disc, with a wobble groove in the read-only area modulated by depressions in the substrate and extending into the substrate in the recordable area. See U.S. Pat. No. 6,480,462 to Ha et al. For example, this technology was incorporated in the Kodak PictureCD product (but is not used in the current generation of the PictureCD product) and is sometimes referred to as CD-PROM technology. The CD-PROM PictureCD product includes a hybrid optical recording disc wherein PictureCD software is prerecorded in the read-only area of the disc, and the recordable area is available for the user to record JPEG image files (such as for scanned photos, digital camera files, graphics downloaded from the Internet, etc.). The PictureCD software can index the image files and present them within the PictureCD application, bypassing the need to have a photofinisher create the disc.

Although these types of hybrid media allow potentially for distribution of pre-recorded content stored in one part of the medium, along with provision of a recordable area onto which additional data and information can be selectively recorded by a user, no teaching or suggestion has been found by the applicant of adapting the hybrid medium to control content that can be recorded in the recordable area of the medium as disclosed and claimed in this patent specification.

Another digital medium through which content is popularly obtained is the Internet. For many users, the personal computing system is their gateway to the wealth of content available through the Internet. For example, broadband Internet access is becoming increasingly popular and affordable, and can facilitate video-on-demand (VOD). Many personal computing systems are adapted with software and/or hardware for accessing and reproducing multimedia content from the Internet and/or from other digital media such as optical recording media.

Broadband content distribution is viewed by many in the pre-recorded content industry (anywhere along the distribution chain) as a challenge to content ownership rights. That is, the concern is that broadband media may ultimately replace distribution of content through pre-recorded optical media in a way threatening content ownership rights.

However, although broadband content access is very convenient for consumers in some ways (for example, saving the consumer a trip to the retailer), it does not provide the consumer with many of the benefits of an optical medium. For example, an optical medium is not only a distribution medium but also a storage medium. Therefore, the consumer can enjoy the content stored on the optical medium in piecemeal fashion and in many instances repeatedly. In addition, the content stored on the optical medium can be enjoyed at a high quality level, without regard to how many other users are requesting similar content at the same time, or the load on the broadband network at that time. Also, acceptable content ownership rights protection has been established for pre-recorded optical media.

The popularity of home networks likewise is rapidly increasing. Content distribution within a home network, such as by streaming the content across the home network, has been proposed.

However, as a practical matter, it can (in many instances) be substantially faster to store content on an optical disc and walk the disc to another room in the home than it is to stream the content over today's WiFi or Cat-5 network home system, unless a quantity of the streamed data is severely restricted at the expense of quality of the content. In addition, home network storage capacity can be overwhelmed if content becomes high definition (HD) quality. It is less expensive and more practical for consumers to have a larger offline optical storage library and a smaller magnetic online storage capacity.

Assorted services providing VOD download of movies are now available.

For example, one service, Movielink, allows users to download movies through a broadband connection to the Internet, for a fee (in a range of $1.99 through $4.99) per movie. The user can start viewing the movie within a few minutes of the start of download, or store the downloaded movie on hard disk for later viewing. The user has a 24-hour viewing period starting from when the user first clicks Play.

Another service, CinemaNow, allows in addition a number of other options for obtaining a movie through the Internet. A user can elect either to download or stream (that is, view right away as the movie is received) the movie. The user can also select DOWNLOAD-TO-OWN and pay a higher fee, in order to download the movie for viewing an unlimited number of times and with no time restrictions. A user can also become a Premium Pass Plus member by paying a subscription fee which entitles the member to unlimited access to any available movie, with no limitation.

Another VOD service, Akimbo, provides users with the equipment to download content from the Internet without using a personal computer. Akimbo supplies a VOD player which includes an Ethernet connector and a user interface for the user to select from assorted categories of content, such as Movies, Sports, Music, TV & Video, Kids, Lifestyle, etc. The user must purchase the player and pay a monthly or a lifetime subscription fee. In addition, the user pays for premium content.

Another subscription service, MovieBeam, allows subscribers to select for viewing movies downloaded to a set-top box via over-the-air TV broadcast spectrum. The set-top box stores 100 movies, with ten movies being replaced with new movies every week. The subscriber pays a monthly equipment rental fee and a per-movie-viewed fee. Each movie viewed can be repeatedly viewed over a 24-hour period. In addition to the movies, the subscriber receives complementary content, such as trailers, behind-the-scene footages, making of featurettes, interviews, short films, etc.

In addition, some movie content providers, such as STARZ! On Demand, have contracted with digital cable and satellite broadcast providers to provide VOD content directly to the consumer. Similar to the parent movie network, STARZ! On Demand charges members a monthly subscription fee. The subscriber does not pay for downloaded movies, but of course must pay a monthly fee for the digital cable or satellite service.

Encoding and data compression technologies are applied in many instances to secure the content and reduce data quantity for transmission. For example, technology developed by DivX Network has been proposed for compressing VOD content.

The disclosures of the above-mentioned VOD services are hereby incorporated by reference into this application in order to more fully describe the state of the art as of the date of the subject matter described and claimed herein.

Many consumers seek the advantages of optical media storage by attempting to save onto optical media content downloaded through a broadband medium or otherwise received. Many (if not most) of the personal computers currently sold include hardware and software for recording content onto recordable optical media. However, since content providers are sensitive to unauthorized use of downloaded content, they typically take measures which make it difficult for the content to be saved, at a high quality, by the consumer onto optical media. For example, content owners typically do not make available for Internet downloads their most valuable content, such as current (first-run) movies, because of concern with unauthorized downloads and unauthorized distribution.

SUMMARY

This application describes secure optical media storage. In one embodiment, an optical recording medium includes a read-only zone and a writable area, wherein copy control and optional information is stored in the read-only zone, and the copy control information specifies (A) an authorized content source and (B) content which is authorized to be downloaded from the authorized content source and recorded in the writable area of the optical recording medium, which can be a specific and unique medium.

The application also describes methodologies for secure distribution of content. In one embodiment, a method for distributing content through a portable medium which can be transported by hand from one media player to another media player, includes (a) providing to an authorized user an optical recording medium comprising a read-only zone and a writable area, wherein electronic copy control and optional other information is stored in the read-only zone of the optical recording medium, the copy control information is read by an optical media player and specifies (I) an authorized content source and (II) content which is authorized to be downloaded from the authorized content source and recorded in the writable area of the optical recording medium (and optionally an identification of the medium), (b) checking the copy control information stored in the read-only zone of the optical recording medium, before information is recorded in the writable area of the optical recording medium, and (c) allowing (i) downloading from the authorized content source of a file and (ii) recording of the downloaded file in the writable area of the optical recording medium, if the file relates to the content which is authorized to be downloaded and recorded according to the copy control information.

BRIEF DESCRIPTION OF THE DRAWINGS

The features of the present application can be more readily understood from the following detailed description with reference to the accompanying drawings wherein.

DETAILED DESCRIPTION

This application provides tools in the form of improved optical media storage and methodologies for secure distribution of content. The tools enable a new business model, and adapt conventional optical media technology with integrated broadband content access, to deliver content securely and enable content owners to maintain and even improve their current margins in an electronic content delivery system.

Figure 1A:
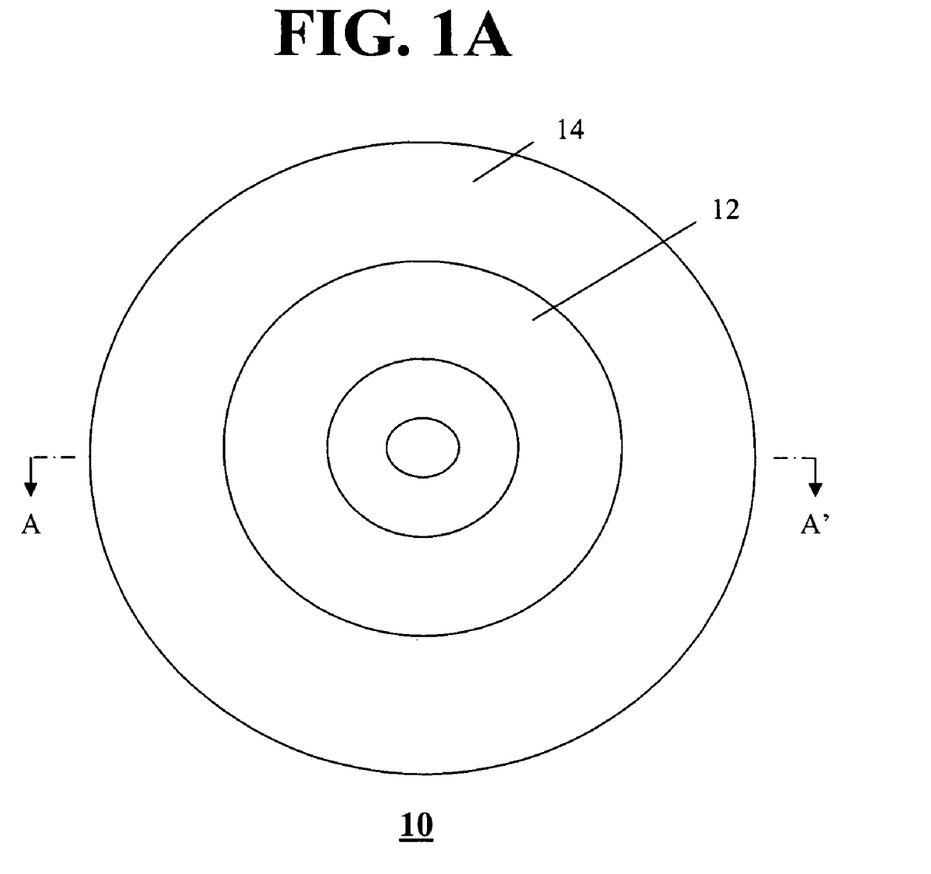
FIG. 1A shows a plan view of an optical recording medium, according to an example of an embodiment of the present disclosure.

An improved optical recording medium 10, according to an embodiment of this disclosure (FIG. 1A), comprises a read-only zone 12 and a writable area 14. Copy control information is stored in the read-only zone. The copy control information specifies (a) an authorized content source and (b) content which is authorized to be downloaded from the authorized content source and recorded in the writable area of the optical recording medium. This improved optical recording medium is referred generally in this disclosure as a "Secure Disc".

Figure 1B:
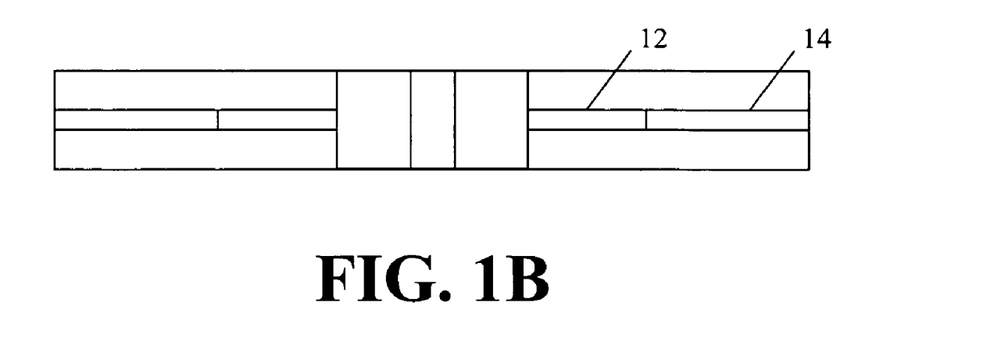
FIG. 1B shows a sectional view of an optical recording medium cut along the line AA' shown in FIG. 1A, according to one exemplary embodiment.

Any of the hybrid optical media discussed above can be adapted with the improvements taught herein. For example, according to one exemplary embodiment (FIG. 1B), the read-only zone 12 and the writable area 14 are located on the same information layer of the Secure Disc.

A Secure Disc 20, according to another exemplary embodiment (FIG. 2), comprises a ROM disc 22 and an optically recordable disc 24. The ROM disc 22 and the optically recordable disc 24 adhere to each other. The ROM disc includes the read-only zone for storing the copy control information, and the optically recordable disc includes the writable area for recording a file relating to the content which is authorized to be downloaded and recorded according to the copy control information.

Figure 2:
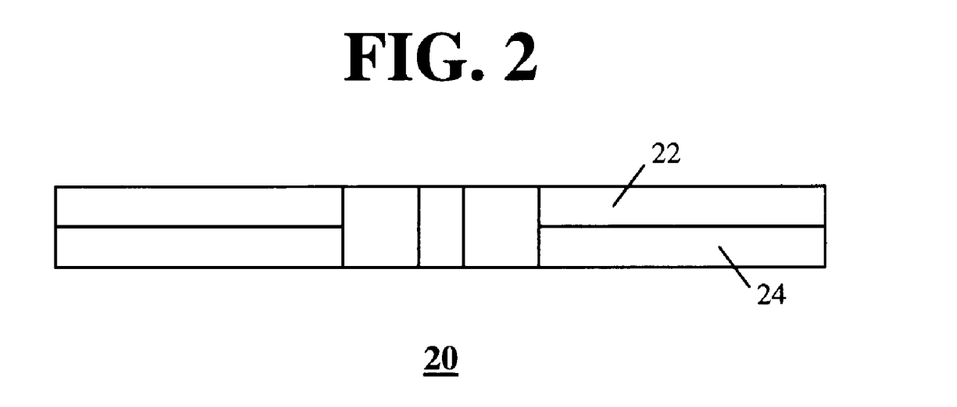
FIG. 2 shows a sectional view of an optical recording medium cut along the line AA' shown in FIG. 1A, according to another exemplary embodiment.

The ROM disc 22 may optionally include prerecorded content, such as clips from movies (or even a full-length movie) starring a particular actor (for example, Tom Hanks), accompanied by copy control information for downloading additional optional content relating to the same actor. For example, the additional content may include one or more entire movies, a video clip of one of the actor's Oscar acceptance speeches, video clips from the actor's other performances (for example, television appearances), videos of one or more interviews of Tom Hanks, etc. The various available content need not be tied to a particular actor and can be related instead by a common subject (for example, new releases, Oscar winners, etc.), genre (for example, action, comedy, cooking, drama, sports, etc.), source (for example, a particular studio, the NBA, a particular computer game maker, etc.), etc., or may even be entirely unrelated at all.

In another embodiment (FIG. 3), a Secure Disc 30 comprises a first information layer 32 and a second information layer 34. The first layer 32 includes the read-only zone for storing the copy control information. The second layer 34 includes the writable area for recording a file relating to the content which is authorized to be downloaded and recorded according to the copy control information.

Figure 3:
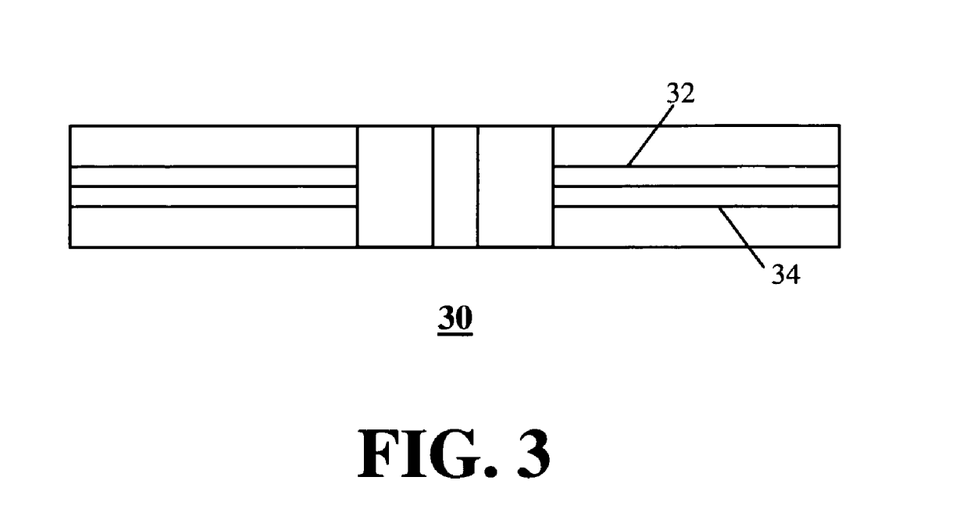
FIG. 3 shows a sectional view of an optical recording medium cut along the line AA' shown in FIG. 1A, according to another exemplary embodiment.

For example, the Secure Disc 30 may be a HD-DVD (also referred to as AOD) disc or Blu-ray disc, adapted with the subject matter of this disclosure. HD-DVD and Blu-ray are two proposed formats, which are competing to be the standard for the next generation optical recording disc. Each of HD-DVD and Blu-ray provides a pre-recorded format and a recordable format. Each format is designed for use with blue laser technology, in order to achieve higher data density, such as would be required for recording high definition video.

The improved optical media storage can be a recordable disc augmented with a read-only zone. The remainder of the disc can be standard CD-R/DVD-R, CD-RW/DVD-RW, CD-RAM/DVD-RAM or other recordable media, depending on the application. The read-only zone can be any capacity or diameter. The read-only zone adds robust, advanced copy protection and copy control to the disc.

The DVD specification which specifies the format of data on DVDs provides for an optional Burst Cutting Area inside of the lead-in area of a DVD. The Burst Cutting Area is intended to be a location on a replicated DVD onto which a bar code (upto 188 bytes), as an unique serial code for the DVD, can be written by a power laser (Annex K). It has been proposed that the serial code can be used for tracking DVDs and thereby also serve an objective of copy prevention. However, no teaching or suggestion has been found by the applicant of using the Burst Cutting Area to record copy control information specifying an authorized 4 content source and content which is authorized to be recorded on the optical recording medium.

Any of the various possible types of content and content sources can be specified by the copy control information as being authorized. For example, the copy control information can specify that any movie content originating from a specified movie studio (for example, Twentieth Century Fox, MGM, Warner Brothers, etc.) is authorized for download from a specified VOD (video on demand) web site, and for recording onto the Secure Disc.

The copy control information stored in the read-only zone can optionally include one or more of the following:

(a) security information which the authorized content source retrieves from the read-only zone of the Secure Disc and verifies, before the authorized content source allows download of the authorized content from the authorized content source;

(b) an identifier unique to the Secure Disc (for example, authorized content recorded in the writable area of the Secure Disc is keyed to the identifier unique to the Secure Disc, and playback of the content recorded in the writable area of the Secure Disc requires a media player which extracts the identifier from the copy control information stored in the read-only zone and uses the extracted identifier as a key to retrieve the content from the writable area of the Secure Disc);

(c) information which specifies one or more recorder devices authorized to receive the authorized content from the authorized content source and record the content in the writable area of the Secure Disc;

(d) information which specifies one or more player devices authorized to reproduce content recorded in the writable area of the Secure Disc;

(e) an identifier uniquely identifying an authorized user;

(f) information specifying a number of content files authorized to be recorded in the writable area of the Secure Disc; and (g) information specifying a time window within which a file recorded in the writable area of the Secure Disc can be played back.

In addition, the copy control information can key the content authorized to be recorded in the writable area of the Secure Disc, to a particular movie or a class or category of movies by type, date or another criteria.

The copy control information may also include a cipher key for decoding downloaded content, in order to play the content. The copy control information can include information for determining whether selected content is authorized to be recorded in the writable area of the Secure Disc, as well as information specifying when, how and by whom content recorded in the writable area can be reproduced. For example, the copy control information can include license information, both in an actionable (for example, machine executable) form and a human-readable (for example, textual) form. The actionable license can serve as a key, as referenced elsewhere herein. The license can be used to transact with the content source for download of authorized content.

In addition, the copy control information can be keyed to information which is only known to the content source and authorized recorder devices (e.g. 58 in FIG. 5) (and perhaps authorized player devices), and the key information is required to retrieve the copy control information from the read-only zone.

The content delivered by the content source is preferably watermarked.

Accordingly, the copy control information as well as the content recorded on the Secure Disc can be protected from unauthorized replication.

The writable area can include one or more rewritable zones and/or one or more recordable, write-once zones.

Figure 4:
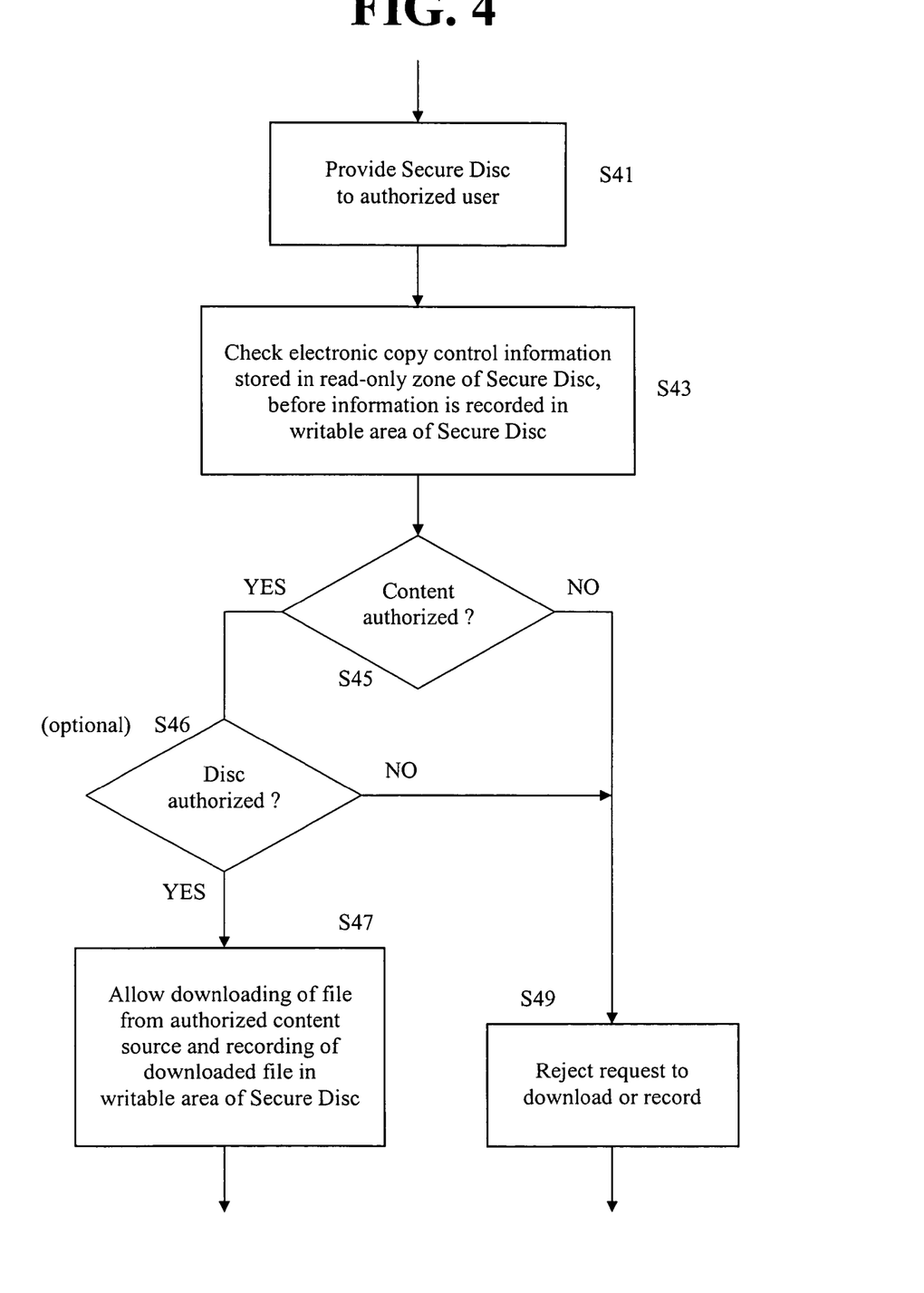
FIG. 4 shows a flow chart illustrating a method for distributing content through a portable medium which can be transported by hand from one media player to another media player, in an embodiment of the present application.
Figure 5:
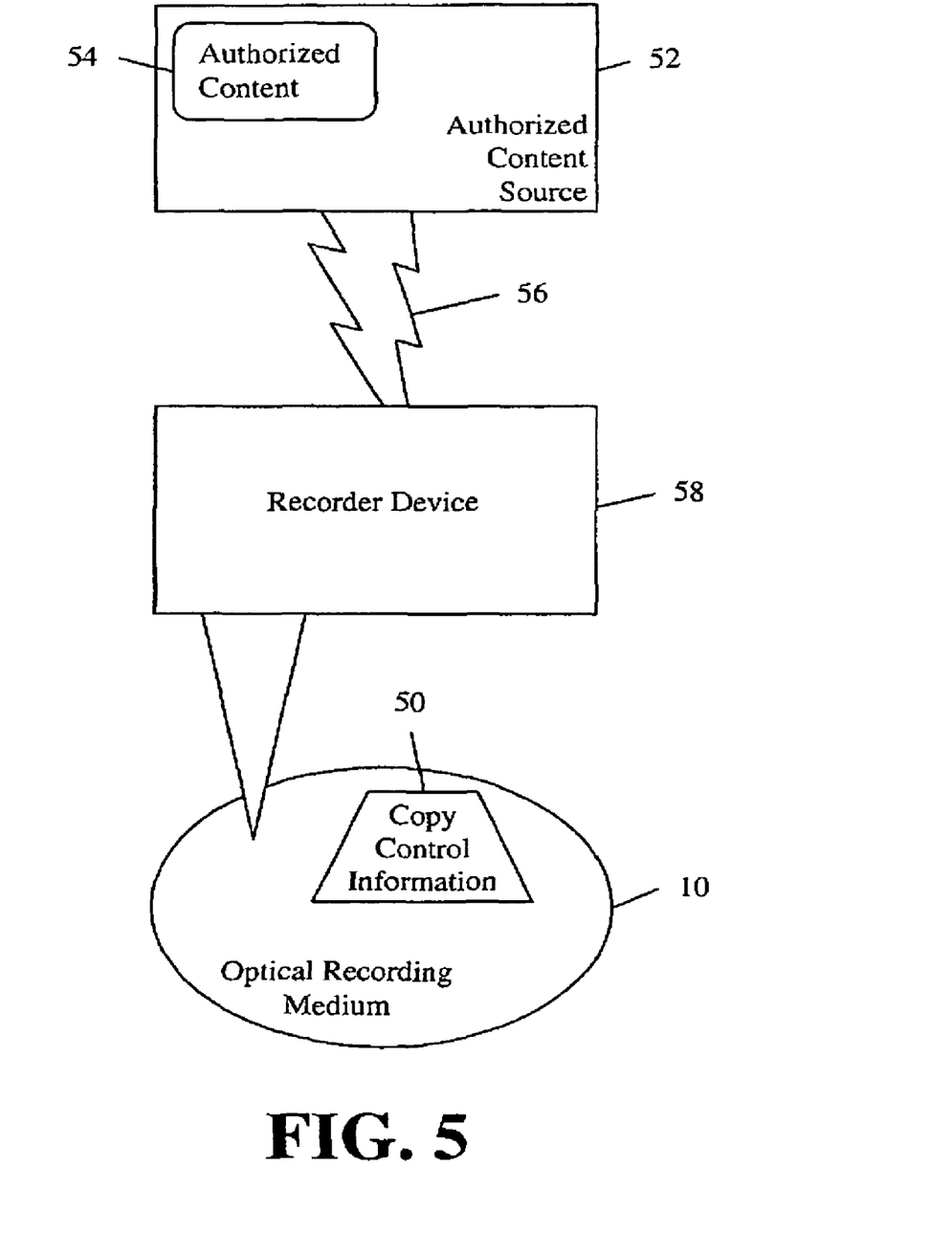
FIG. 5 illustrates interaction amongst an optical recording medium, a recorder device, a network or communication link, an authorized content source and authorized content according to an exemplary embodiment.

According to a business model incorporating an exemplary embodiment of this disclosure, a method for distributing content through a portable medium which can be transported by hand from one media player to another media player, includes [as illustrated in FIG. 4 and FIG. 5] providing to an authorized user a Secure Disc 10 (step S41). The electronic copy control information 50 stored in the read-only zone of the Secure Disc 10 is checked (step S43), before information is recorded in the writable area of the Secure Disc 10. Downloading from the authorized content source 52 of a file and recording of the downloaded file in the writable area of the Secure Disc 10 is permitted (step S47), if the file relates to the content which is authorized to be downloaded 54 and recorded by recorder device 58 according to the copy control information 50 (step S45, YES). An optional step may be included to check whether the disc is authorized (step S46), before downloading and/or recording is allowed to proceed. If the file does not relate to content which is authorized 54 (step S45, YES) or the disc is not authorized (step S46, NO), the request to download or record is rejected (step S49). The file recorded in the writable area of the Secure Disc 10 can be downloaded from the authorized content source 52 through the Internet or one or more other networks 56 (and/or satellite transmission).

Content distribution may be effected through a client-server system or another type of computer system (such as a peer-to-peer system). Client software may be included in the read-only zone of the Secure Disc. The client software may include a user interface (for example, a browser) which presents a user with instructions for accessing and downloading content from one or more authorized content sources. The client software may include media player software and/or an interface to a media player and/or optical media recorder software resident in the user's computer system.

The client software is adapted to communicate with the server to perform necessary handshaking in compliance with security requirements and to establish a communication channel with the server (as well as in some instances with a content source other than the server), while using, and/or guided by, the copy control information stored in the read-only zone. The client may include code for performing many of the security tasks, or alternatively it may be configured as a thin client through which the server obtains the required security information and/or performs the security tasks.

The use of client-server systems (and peer-to-peer systems) for communication of content and e-commerce is well-known, and therefore a detailed discussion is omitted in the interest of clarity and brevity.

The file recorded in the writable area of the Secure Disc can be downloaded from the authorized content source, saved to an intermediate digital content storage device, and then recorded in the writable area of the Secure Disc. The intermediate digital content storage device can be a hard disk of a personal computer, or in a digital video recorder.

The Secure Disc can be provided to the authorized user through a content distributor or content service provider in exchange for a fee, according to one exemplary business model. The fee preferably is commensurate with the content to be recorded in the writable area of the Secure Disc.

In another exemplary business model, the authorized user maintains an account with a content distributor or content service provider, the Secure Disc is provided to the authorized user through the content distributor or content service provider, and a fee is charged to the account each time a file is downloaded from the authorized content source and recorded in the writable area of the Secure Disc.

According to another exemplary business model, the authorized user pays a subscription fee to a content distributor or content service provider, and the Secure Disc is provided to the authorized user through the content distributor or content service provider.

In each instance, the copy control information stored in the read-only zone of the Secure Disc can include an identifier uniquely identifying the content distributor or content service provider through whom the Secure Disc is provided and/or to whom the fee is paid.

The downloaded content can be selectively filtered and the filtered content is recorded in the writable area of the Secure Disc. For example, the downloaded content can be selectively filtered based on an edit list. Alternatively, the content can selectively be filtered based on user selection.

The methodologies of this application may largely be implemented through one or more computer programs stored on a computer readable medium and/or transmitted via a computer network or other transmission medium.

The above specific embodiments are illustrative, and many variations can be introduced on these embodiments without departing from the spirit of the disclosure or from the scope of the appended claims. For example, elements and/or features of different illustrative and exemplary embodiments herein may be combined with each other and/or substituted for each other within the scope of this disclosure and appended claims.

In addition, further non-limiting details are described in the following examples which are set forth to aid in an understanding of the subject matter of this application, but are not intended to, and should not be construed to, limit in any way the claims which follow thereafter.

In one exemplary application of the subject matter of this disclosure, Secure Discs can be created for the NFL (i.e. National Football League) and made available through retail chains or as a premium incentive for subscribers of a content service (such as TiVo®, cable TV, satellite TV, etc.). Copy control information can be prerecorded in a read-only zone of a Secure Disc for the NFL, and include security information which, indicates that the disc is authorized for storing (i) NFL content generally, (ii) a specific NFL game (for example, the Super Bowl), (iii) NFL games during a specific time period (such as one or more weeks of the NFL regular season or playoffs), and/or (iv) one or more games played by a specific NFL team, etc. The copy control information may also provide security information allowing the subscriber to download other information, such as team and/or player statistics or profiles (including photos, highlight videos, interviews, etc.) from the NFL web site, and save the downloaded information onto the Secure Disc.

In an example in which the Secure Discs are provided by TiVo, a DVR (digital video recorder) device can be used to record an NFL game and it may be desired to store the recorded content on a Secure Disc.

After an NFL game is recorded on the DVR device, the subscriber has the option to store the recorded game on an authorized Secure Disc. In many instances, the subscriber will be motivated by any one or more of several reasons to store the recorded content onto a Secure Disc. As mentioned above, the Secure Disc is portable media which can allow the subscriber to transport the stored content quickly to another room in the home and replay the content in the other room, without waiting for the content to be transferred through a home network or another network. In addition, DVRs typically have limited storage, and new recordings will automatically replace the oldest recordings stored in the DVR storage when no empty storage is available. Since a subscriber can program a DVR device to make regular recordings (for example, every night from 8 p.m. through 10 p.m.), the storage can be quickly expended, with or without knowledge of the subscriber. Therefore, when such a subscriber downloads specific NFL content, the subscriber will likely want to archive the downloaded NFL content onto a Secure Disc.

The DVR device typically has a number of input/output ports which allow the device to communicate with other devices, such as an optical media recorder (e.g. 58 in FIG. 5), with or without going through a personal computing system. The DVR device can be adapted through its onboard programming to retrieve copy control information from the read-only zone of the disc and determine the allowed uses of the disc. The DVR device can also check to verify that the copy control information recorded in the read-only zone of the Secure Disc indicates that the disc is authorized to record content from the DVR device. The details of the digital rights management (DRM) scheme in this case can be determined by the NFL and/or TiVo. In addition, the playback window and device interoperability can be specified in the copy control information, in accordance with the DRM scheme adopted by the NFL and/or TiVo.

The subscriber can be charged a fee for recording the NFL content onto the Secure Disc. A fee may be charged for each recording or for each disc, or may be a monthly or yearly subscription fee (or a subscription fee charged for any specified period of time) for a premium service which entitles the subscriber to make a specified number of authorized recordings on the disc or as many recordings as the subscriber desires.

The DVR device may store only highlights of the game on an NFL Secure Disc. When only highlights are to be stored on the Secure Disc, the highlights to be stored can be selected by the subscriber or controlled by an edit list supplied to the DVR device after the DVR device has recorded an entire game. Because the NFL generally cannot distribute highlights in a timely and cost-effective manner to each team's market, this distribution channel (that is, through a content service provider such as TiVo) allows the NFL to obtain a new source of revenue.

The Secure Disc can have a unique identifier, and the stored content can be keyed to the particular Secure Disc through the unique Secure Disc identifier. Playback of the Secure Disk on a personal (or laptop) computer may require media player software which compares the Secure Disc identifier to the key information in the stored content. Each subscriber may be assigned a unique user identifier which is recorded on any Secure Disc(s) provided to the subscriber, and the media player provided to the subscriber may be keyed to play stored content only from a Secure Disc containing the subscriber's user identifier. Thus, motivation for unauthorized copies of the copyrighted program stored on the Secure Disc can be limited.

The business model can also be adapted for content distributors. Some retail content distributors (for example, Netflix®, Blockbuster®, etc.) currently operate as online DVD rental companies. More specifically, consumers pay a monthly fee (and thereby become "members") and can order selected content (for example, movies, games, etc.) through the content distributor's web site. The content is stored on a prerecorded DVD. A DVD containing content selected by a member is mailed to the member from one of the local warehouses maintained by the content distributor, such that the member receives the ordered DVD within a few days. The envelope containing the DVD mailed to the member also contains a postage-prepaid return envelope for the member to return the DVD to the content distributor. The member is not charged a fee for the postage (for either way). The monthly fee can vary according to the limit of the number of DVDs the member wishes to have at any time (for example, $17.99 for a maximum of three DVDS, $22.99 for a maximum of four movies, 26.99 for a maximum of five movies, etc.). The member can keep the DVD for as long as the member wants, with a limitation on the number of DVDs that can be out at any time.

However, while the current business model of such content distributors have been somewhat successful, many improvements can be made thereupon. For example, postage constitutes a large portion of the operating expense of these content distributors. In addition, in order to fulfill the promise of a large number of titles being available to members and the promise that a member will receive each ordered DVD within a couple of days (i.e. 1-3 days), the content distributor must maintain large inventories of prerecorded DVDs at each local warehouse.

Such drawbacks can be avoided through use of Secure Disks as the storage media. For example, rather than maintaining large inventories of prerecorded DVDs at each local warehouse, the content distributors can maintain a much smaller inventory of Secure Disks and a secured web portal to an online library of content, and have the member download the ordered content from the secured web portal and save onto the Secure Disc. The read-only zone of the Secure Disc mailed to the member can be keyed to download website security.

In addition, postage expense can be reduced by using rewritable Secure Disc. For example, upon subscription to the online content service, a specified number of rewritable Secure Discs can be mailed to the member (with option of replacement for a fee). The subscriber can reuse the rewritable Secure Discs over and over to "rent" content from the website. Each time content is written to the rewritable Secure Disc any existing content on the disc is overwritten.

Under a modified business model, instead of buying DVDs from content providers (such as movie studios, computer game manufacturers, etc.) and renting the DVDs to consumers, the content distributor obtains the right from the content provider to distribute content electronically. The agreement between content provider and content distributor typically would require the content distributor to outsource facilities for file serving, watermarking, individual encryption, plus tracking and auditing of transactions. The distribution agreement may require the content provider to collect a fee per transaction. Secure Discs can be used to provide secure content distribution for premium services as well as for standard digital broadcast time-shifting.

The premium services can be provided directly by content providers, bypassing distributors and service providers, such as when the content occupies a niche market. For example, a content provider (such as HBO®) can offer consumers high definition (HD) content "record" service through which consumers can legally record high-quality high definition programming from HBO onto a Secure Disc. HBO can provide the Secure Disc, as well as perhaps the equipment (hardware and/or software), to the consumer, keyed to HBO's HD content and allowing the consumer to time-shift and move content within his/her home. Content delivery from HBO to local storage will be in real time (scheduled broadcast) or faster (HBO on Demand). HBO may implement a limited play window for time shifting or even offer a "sell through" model (for example, through TiVo or a Cable or satellite TV service provider).

The copy control information on the Secure Disc may also provide security information allowing the subscriber to download other information, such as profiles of shows and/or actors (including photos, videos clips, interviews, etc.) from the HBO web site, and save the downloaded information onto the Secure Disc.

What is claimed is:

1. An optical recording medium comprising:
    a first information layer including a read-only zone including a plurality of embossed pits containing copy control information readable by directing a reproducing laser light beam thereto; and
    a second information layer including a writable area to which information is recorded by controlling a recording laser light beam directed to the writable area,
    wherein said copy control information specifies (a) an authorized content source and (b) content which is authorized to be downloaded by a recorder device through a network from said authorized content source and recorded in said writable area of the optical recording medium,
    said copy control information is read and verified to determine whether a specific content is authorized to be downloaded from said authorized content source through the network to the recorder device and recorded by the recorder device in said writable area before the specific content is allowed to be downloaded from said authorized content source through the network to the recorder device and recorded by the recorder device in said writeable area,
    the first information layer including the read-only zone and the second information layer including the writable area are stacked one atop the other in a thickness direction of the optical recording medium,
    said plurality of embossed pits included in the read-only zone in said first information layer contain the copy control information indicating the content which is authorized to be downloaded from said authorized content source and recorded in said writable area, and
    said copy control information includes security information which the authorized content source retrieves from said read-only zone of the optical recording medium and verifies, before the authorized content source allows download of the authorized content from the authorized content source.

2. The optical recording medium as claimed in claim 1, wherein said copy control information includes an identifier unique to the optical recording medium.

3. The optical recording medium as claimed in claim 2, wherein the authorized content recorded in said writable area of the optical recording medium is keyed to the identifier unique to the optical recording medium, and playback of the content recorded in the writable area of the optical recording medium requires a media player which extracts the identifier from the copy control information stored in said read-only zone and uses the extracted identifier as a key to retrieve the content from the writable area of the optical recording medium.

4. The optical recording medium as claimed in claim 1, wherein said copy control information further specifies one or more recorder devices authorized to receive said authorized content from said authorized content source and record the content in said writable area of the optical recording medium.

5. The optical recording medium as claimed in claim 1, wherein said copy control information further specifies one or more player devices authorized to reproduce content recorded in said writable area of the optical recording medium.

6. The optical recording medium as claimed in claim 1, wherein said copy control information includes an identifier uniquely identifying an authorized user.

7. The optical recording medium as claimed in claim 1, wherein the optical recording medium comprises a read-only disc and an optically recordable disc, said read-only disc and said optically recordable disc adhere to each other, said read-only disc includes said read-only zone for storing said copy control information, and said optically recordable disc includes said writable area for recording a file relating to said content which is authorized to be downloaded and recorded according to said copy control information.

8. The optical recording medium as claimed in claim 1, wherein said writable area includes at least one of a rewritable zone and a recordable, write-once zone.

9. The optical recording medium according to claim 1, wherein the writeable area comprises one of an irreversibly heatable photosensitive organic dye and a material having a polycrystalline structure, the polycrystalline structure being configured to be reversibly changed from more crystalline to less crystalline according to a selective application of heat.

10. The optical recording medium according to claim 1, wherein the read-only zone also stores client software for presenting a user with instructions for accessing and downloading content.

11. The optical recording medium according to claim 1, wherein the read-only zone also stores client software for playing media.

12. The optical recording medium according to claim 1, wherein the read-only zone also stores client software for recording content to the writeable area.

13. The optical recording medium according to claim 1, wherein the read-only zone also stores client software for communicating with a content source.

14. The optical recording medium according to claim 1, wherein the specification of said authorized content by said copy control information includes a specification of at least one of a content creator, a specific content title and a class of content meeting a specific criteria.

15. The optical recording medium according to claim 1, wherein said copy control information is keyed to key information not stored in the optical recording medium, and the key information is required to retrieve the copy control information from the optical recording medium.

16. An optical recording medium comprising:
(i) a first information layer comprising a read-only zone including a plurality of embossed pits containing copy control information and
(ii) a second information layer comprising a writable area to which content is to be recorded, wherein
the first information layer including the read-only zone and the second information layer including the writable area are stacked one atop the other in a thickness direction of the optical recording medium,
said copy control information specifies an authorized content source and content which is authorized to be downloaded by a recorder device through the Internet from said authorized content source and recorded by the recorder device in said writable area of the optical recording medium,
the plurality of embossed pits included in the read-only zone containing the copy control information indicating the content which is authorized to be downloaded from said authorized content source and recorded in said writable area, and
said copy control information includes security information which the authorized content source retrieves from said read-only zone of the optical recording medium and verifies, before the authorized content source allows download of the authorized content from the authorized content source.

17. An optical recording medium comprising:
a first information layer comprising a read-only zone including a plurality of embossed pits containing copy control information readable by directing a reproducing laser light beam thereto; and
a second information layer comprising a writable area to which information is recorded by controlling a recording laser light beam directed to the writable area, wherein
the first information layer including the read-only zone and the second information layer including the writable area are stacked one atop the other in a thickness direction of the optical recording medium,
said copy control information specifies (a) an authorized content source comprising an authorized electronic appliance and (b) content which is authorized to be downloaded from said authorized electronic appliance by a recording device through a dedicated communication link between the recording device and the authorized electronic appliance and recorded by the recording device in the writable area of the optical recording medium,
the plurality of embossed pits included in the read-only zone contain the copy control information indicating the content which is authorized to be downloaded from said authorized content source and recorded in said writable area, and
said copy control information includes security information which the authorized content source retrieves from said read-only zone of the optical recording medium and verifies, before the authorized content source allows download of the authorized content from the authorized content source.

\* \* \* \* \*